US 7,452,618 B2

(12) United States Patent
Tanaka et al.

(10) Patent No.: US 7,452,618 B2
(45) Date of Patent: Nov. 18, 2008

(54) FUEL CELL COGENERATION SYSTEM

(75) Inventors: Yoshikazu Tanaka, Osaka (JP); Akinari Nakamura, Osaka (JP); Masataka Ozeki, Osaka (JP)

(73) Assignee: Panasonic Corporation, Osaka (JP)

( * ) Notice: Subject to any disclaimer, the term of this patent is extended or adjusted under 35 U.S.C. 154(b) by 831 days.

(21) Appl. No.: 10/507,564

(22) PCT Filed: Sep. 19, 2003

(86) PCT No.: PCT/JP03/11997
§ 371 (c)(1),
(2), (4) Date: Sep. 13, 2004

(87) PCT Pub. No.: WO2004/027914
PCT Pub. Date: Apr. 1, 2004

(65) Prior Publication Data
US 2005/0164056 A1    Jul. 28, 2005

(30) Foreign Application Priority Data
Sep. 20, 2002    (JP) .............................. 2002-275693

(51) Int. Cl.
*H01M 8/04* (2006.01)
(52) U.S. Cl. .............................. 429/13; 429/24; 429/26
(58) Field of Classification Search ........................ None
See application file for complete search history.

(56) References Cited
U.S. PATENT DOCUMENTS
6,383,672 B1    5/2002 Fujita 6,420,060 B1    7/2002 Yamamoto et al.
7,147,951 B1*  12/2006 Miyauchi et al. .............. 429/26
2002/0146605 A1   10/2002 Nakanishi et al.

FOREIGN PATENT DOCUMENTS

| JP | 08-255624 | 10/1996 |
| JP | 2000-340244 A | 12/2000 |
| JP | 2001-023668 A | 1/2001 |
| JP | 2001-143737 A | 5/2001 |
| JP | 2001-255010 | 9/2001 |

(Continued)

OTHER PUBLICATIONS

International Search Report for PCT/JP2003/11997, dated Jan. 20, 2004, (with English translation).

*Primary Examiner*—Jonathan S Crepeau
(74) *Attorney, Agent, or Firm*—RatnerPrestia (57) ABSTRACT

A fuel cell cogeneration system includes a fuel cell, a cooling water heat exchanger provided on a cooling water pathway, a stored hot water pathway through which stored hot water that exchanges heat with cooling water flows, a stored hot water tank, a stored hot water controlling device, a stored hot water temperature measuring device, a stored hot water flow rate adjusting device, a flow rate controlling device of controlling the stored hot water flow rate adjusting device and an exhaust gas heat exchanger of exchanging heat between exhaust gas from fuel processing devices and stored hot water. The flow rate controlling device controls the stored hot water adjusting device to reduce the flow rate of stored hot water flowing through the stored hot water pathway when the temperature of stored hot water is a first predetermined temperature or less during the starting of operation of the fuel cell.

10 Claims, 5 Drawing Sheets

FOREIGN PATENT DOCUMENTS

| | | |
|---|---|---|
| JP | 2001-313053 | 11/2001 |
| JP | 2002-025591 | 1/2002 |
| JP | 2002-042841 | 2/2002 |
| JP | 2002-170583 A | 6/2002 |
| JP | 2002-289227 | 10/2002 |
| JP | 2003-123820 A | 4/2003 |
| JP | 2003-257457 A | 9/2003 |
| WO | WO 01/37361 * | 5/2001 |

* cited by examiner

FUEL CELL COGENERATION SYSTEM

THIS APPLICATION IS A U.S. NATIONAL PHASE APPLICATION OF PCT INTERNATIONAL APPLICATION PCT/JP2003/11997.

TECHNICAL FIELD

The present invention relates to a method of operating a fuel cell cogeneration system which performs electricity generation and heat supply using a fuel cell and a program and recording medium therefor.

BACKGROUND ART

Figure 4:
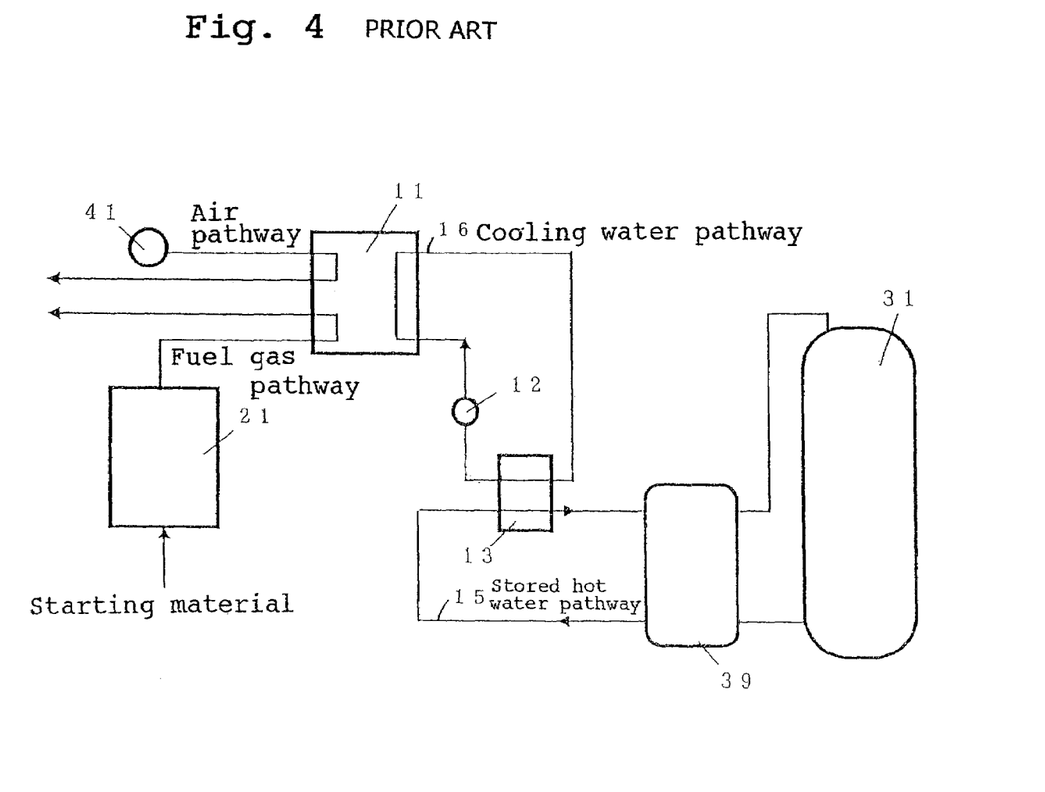
FIG. 4 is a configurational diagram of a related art fuel cell cogeneration system.

A fuel cell cogeneration system cannot generate electricity unless the temperature of the fuel cell is raised to a predetermined temperature and thus needs to be preheated during starting. In the related art fuel cell cogeneration system, a heater is used to heat cooling water by which the temperature of the fuel cell is then raised. However, the temperature raising method using a heater has a disadvantage that the electric power consumed during the starting of the fuel cell cogeneration system is great. Thus, a method has been proposed which comprises utilizing hot water stored in a stored hot water tank to raise the temperature of the fuel cell during starting (see, e.g., JP-A-2002-42841). The configuration of this method is shown in FIG. 4. A fuel cell 11 undergoes reaction of a hydrogen-rich gas (hereinafter referred to as "fuel gas") supplied and an oxidizer gas such as air to generate electric power and heat. The fuel gas is produced by heating a starting material such as natural gas in an atmosphere containing water vapor in a fuel processing means 21. The oxidizer gas is supplied into the fuel cell 11 by an air supplying unit 41.

Cooling water of supplying heat during starting to raise the temperature of the fuel cell 11 and removing the heat generated during electricity generation to maintain the fuel cell 11 at a predetermined temperature is circulated in the fuel cell 11 by a cooling water circulating pump 12. The cooling water which has passed through the fuel cell 11 then exchanges heat with stored hot water in a cooling water heat exchanger 13. In a stored hot water tank 31 is stored hot water of recovering the heat generated by the fuel cell system.

During electricity generation, stored hot water is taken out of the stored hot water tank 31 at the bottom thereof by a waste heat transporting means 39 through which it is sent to a stored hot water pathway 15, and then passed through the cooling water heat exchanger 13 where it then exchanges heat with cooling water flowing through a cooling water pathway 16. The stored hot water which has thus recovered heat is then returned to the top of the stored hot water tank 31 by the waste heat transporting means 39.

During starting, the pathway from the stored hot water 31 to the stored hot water pathway 15 is switched by the waste heat transporting means 39. In other words, stored hot water is taken out of the top of the stored hot water tank 31, and then passed through the cooling water heat exchanger 13 where it supplies heat to cooling water, and the stored hot water which has thus supplied heat to cooling water is then returned to the bottom of the stored hot water tank 31. By thus transferring the heat of the stored hot water tank 31 to cooling water, the temperature of the fuel cell 11 is raised. By raising the temperature of the fuel cell 11 with hot water in the stored hot water tank 31 in the aforesaid fuel cell cogeneration system, the electric power consumed during starting can be reduced.

Figure 5:
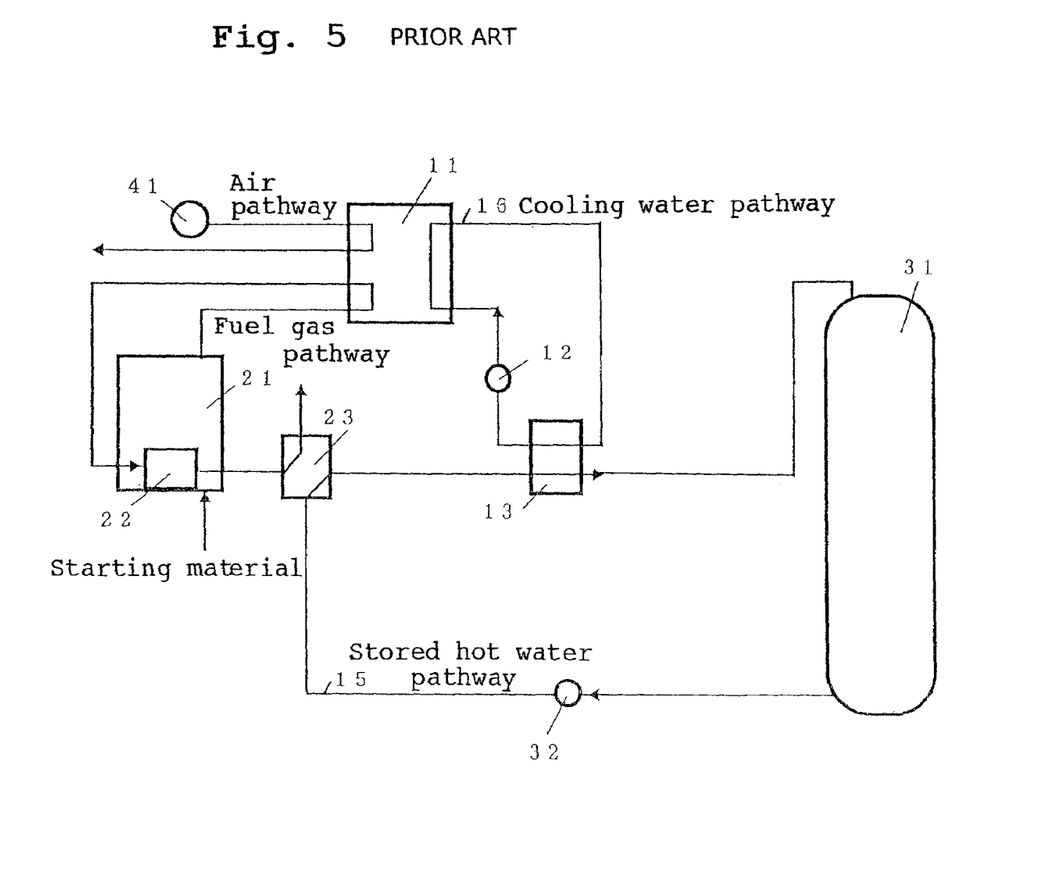
FIG. 5 is a configurational diagram of another related art fuel cell cogeneration system.

Further, as another example, it has been proposed that an exhaust gas heat exchanger 23 of recovering heat from the fuel processing means 21 is provided upstream the cooling water heat exchanger 13 on the stored hot water pathway 15, so that the heat recovered from exhaust gas is transferred to cooling water via the cooling water heat exchanger 13 to accelerate the rise of temperature of the fuel cell as in a fuel cell cogeneration system shown in FIG. 5 (see, e.g., JP-A-2002-25591).

However, the fuel cell cogeneration system shown in FIG. 4 is disadvantageous in that it takes much time to raise the temperature of cooling water when the difference in temperature between the stored hot water and the cooling water which exchange heat with each other is small.

Further, even when only the heat recovered from exhaust gas is utilized to raise the temperature of the fuel cell as in the fuel cell cogeneration system shown in FIG. 5, the time required to start the fuel cell cannot be sufficiently reduced. Thus, a configuration comprising one shown in FIG. 4 and one shown in FIG. 5 in combination can be proposed, but even this case is disadvantageous in that the temperature of the fuel cell cannot reach a desired operating temperature or, even if the operating temperature is reached, the time required to start the fuel cell cannot be sufficiently reduced.

DISCLOSURE OF THE INVENTION

An object of the present invention is to provide a fuel cell cogeneration system, a method of operating a fuel cell cogeneration system and a program and recording medium therefor which can raise the temperature of the fuel cell in a short period of time to reduce the time required until starting even when the difference in temperature between stored hot water and cooling water is small in the light of the afore said problems.

To solve the above problems, a first aspect of the present invention is a fuel cell cogeneration system comprising:
  a fuel cell connected to a fuel processing means and having a cooling water pathway;
  a first heat exchanging means provided on the aforesaid cooling water pathway;
  a stored hot water pathway through which stored hot water undergoes heat exchange with the aforesaid cooling water via the aforesaid first heat exchanging means;
  a stored hot water tank of storing the aforesaid stored hot water;
  a stored hot water controlling means of circulating the aforesaid stored hot water so as to transfer the heat of hot water stored in the aforesaid stored hot water tank to the aforesaid fuel cell via the aforesaid stored water pathway and the aforesaid first heat exchanging means during the starting of operation of the aforesaid fuel cell;
  a stored hot water temperature measuring means of measuring the temperature of stored hot water flown into the aforesaid first heat exchanging means;
  a stored hot water flow rate adjusting means of adjusting the flow rate of stored hot water flowing through the aforesaid stored hot water pathway;
  a flow rate controlling means of controlling the aforesaid stored hot water flow rate adjusting means on the basis of the temperature of stored hot water measured by the aforesaid stored hot water measuring means; and
  a second heat exchanging means connected to the aforesaid stored hot water pathway upstream the aforesaid first heat exchanging means of exchanging heat with exhaust gas of the aforesaid fuel processing means,
wherein the aforesaid flow rate controlling means controls the aforesaid stored hot water flow rate adjusting means to reduce the flow rate of stored hot water flowing through the aforesaid stored hot water pathway when the temperature of the aforesaid stored hot water is a first predetermined temperature or less during the starting of operation of the aforesaid fuel cell.

A second aspect of the present invention is the fuel cell cogeneration system according to the first aspect of the present invention, wherein the aforesaid first predetermined temperature is an operating temperature of the aforesaid fuel cell.

A third aspect of the present invention is the fuel cell cogeneration system of the first aspect of the present invention, wherein a cooling water temperature measuring means is further provided upstream the aforesaid first heat exchanging means on the aforesaid cooling water pathway and the aforesaid flow rate controlling means adjusts the aforesaid stored hot water flow rate adjusting means so that the aforesaid temperature of stored hot water rises to further reduce the flow rate of stored hot water flowing through the aforesaid stored hot water pathway when the aforesaid temperature of stored hot water is less than the sum of the aforesaid cooling water temperature and a predetermined temperature.

A fourth aspect of the present invention is the fuel cell cogeneration system of the third aspect of the present invention, wherein the aforesaid flow rate controlling means adjusts the aforesaid stored hot water flow rate adjusting means so that the aforesaid temperature of stored hot water rises to a second predetermined temperature as upper limit to reduce the flow rate of stored hot water flowing through the aforesaid stored hot water pathway and the aforesaid second predetermined temperature is determined by the temperature required to recover a predetermined amount of water content contained in exhaust gas discharged by the aforesaid fuel processing means in the aforesaid second heat exchanging means.

A fifth aspect of the present invention is the fuel cell cogeneration system of the fourth aspect of the present invention, wherein a recovered water tank of recovering water content contained in exhaust gas discharged by the aforesaid fuel processing means and the aforesaid second predetermined temperature is the temperature at which a predetermined water level can be maintained in the aforesaid recovered water tank while supplying the aforesaid recovered water into the system.

A sixth aspect of the present invention is the fuel cell cogeneration system of the first or third aspect of the present invention, wherein a recovered water tank of recovering water content contained in exhaust gas discharged by the aforesaid fuel processing means is further provided and the aforesaid flow rate controlling means adjusts the aforesaid stored hot water flow rate adjusting means to suspend the drop of the flow rate of stored hot water flowing through the aforesaid stored hot water pathway or to increase the flow rate of the aforesaid stored hot water when the water level in the aforesaid recovered water tank falls below the predetermined value while supplying the aforesaid recovered water into the system.

A seventh aspect of the present invention is the fuel cell cogeneration system of the first aspect of the present invention, wherein the aforesaid first predetermined temperature is predetermined within a range of from 60° C. to 80° C.

An eighth aspect of the present invention is the fuel cell cogeneration system of the fourth aspect of the present invention, wherein the aforesaid second predetermined temperature is predetermined within a range of from 40° C. to 50° C.

A ninth aspect of the present invention is the fuel cell cogeneration system of the third aspect of the present invention, wherein the aforesaid predetermined temperature is predetermined within a range of from 5° C. to 10° C.

A tenth aspect of the present invention is a method of operating a fuel cell cogeneration system comprising a step of circulating the aforesaid stored hot water so as to transfer the heat of hot water stored in the aforesaid stored hot water tank to the cooling water pathway of the aforesaid fuel cell via the aforesaid stored water pathway and the aforesaid first heat exchanging means during the starting of operation of the aforesaid fuel cell;

a step of measuring the temperature of stored hot water flown into the aforesaid first heat exchanging means;

a step of transferring the heat of exhaust gas from the fuel processing means to the aforesaid stored hot water via a second heat exchanging means connected to the aforesaid stored hot water pathway upstream the aforesaid first heat exchanging means; and a step of reducing the flow rate of stored hot water flowing through the aforesaid stored hot water pathway when the temperature of the aforesaid stored hot water is a first predetermined temperature or less during the starting of operation of the aforesaid fuel cell.

An eleventh aspect of the present invention is a program for the fuel cell cogeneration system of the first aspect of the present invention of operating a computer as a flow rate controlling means of controlling the aforesaid stored hot water flow rate adjusting means to reduce the flow rate of stored hot water flowing through the stored hot water pathway when the temperature of the aforesaid stored hot water measured by the aforementioned stored hot water temperature measuring means is a first predetermined temperature or less during the starting of operation of the aforesaid fuel cell.

A twelfth aspect of the present invention is a recording medium having a program of the eleventh aspect of the present invention supported thereon which can be processed by a computer.

In accordance with the present invention, a fuel cell cogeneration system, a method of operating a fuel cell cogeneration system and a program and recording medium therefor which can raise the temperature of the fuel cell in a short period of time to reduce the time required until starting even when the difference in temperature between stored hot water and cooling water is small can be provided.

DESCRIPTION OF SIGNS

11 Fuel cell
12 Cooling water circulating pump
13 Cooling water heat exchanger
14 Cooling water temperature measuring means
21 Fuel processing means 22 Combustor
23 Exhaust gas heat exchanger
31 Stored hot water tank
32 Stored hot water circulating pump
33 Stored hot water pathway switching means
34,35 Three-way valve
36 Stored hot water temperature measuring means
37 Flow rate controlling means
38 Flow rate adjusting means
39 Waste heat transporting means
41 Air supplying unit

BEST MODE FOR CARRYING OUT THE INVENTION

Embodiments of implementation of the present invention will be described hereinafter in connection with FIGS. 1 to 3.

Embodiment 1 of Implementation

Figure 1:
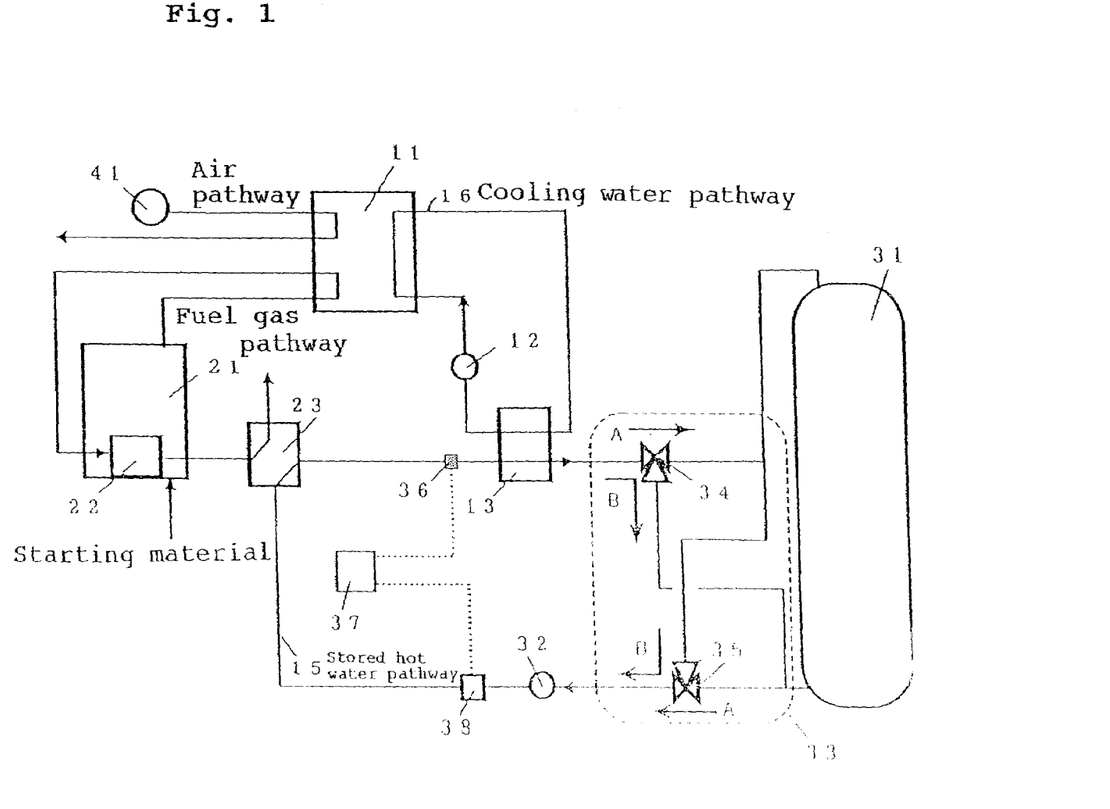
FIG. 1 is a configurational diagram of a fuel cell cogeneration system of embodiment 1 of implementation of the present invention.

The configuration of a fuel cell cogeneration system of an embodiment 1 of implementation of the present invention is shown in FIG. 1. The fuel cell cogeneration system shown in FIG. 1 comprises a fuel cell 11 of generating electric power and heat using a fuel gas and an oxidizer gas such as air, a fuel processing means 21 of heating a starting material to produce a fuel gas and supplying the fuel gas into the fuel cell 11, a combustor 22 disposed inside the fuel processing means 21 of heating the starting material, an air supplying means 41 of supplying an oxidizer gas into the fuel cell 11, a cooling water pathway 16 of circulating cooling water of keeping the fuel cell 11 at a predetermined temperature during the operation of the fuel cell cogeneration system, a cooling water circulating pump 12 of circulating cooling water in the cooling water pathway 16, a cooling water heat exchanger 13 which is provided on the cooling water pathway 16 as an example of the first heat exchanging means of the present invention to perform heat exchange between cooling water and stored hot water, a stored hot water tank 31 of storing hot water, a stored hot water switching means 33 of switching the pathway from the stored hot water tank 31 to the stored hot water pathway 15 using three-way valves 34 and 35 between during starting and during electricity generation, a stored hot water circulating pump 32 of circulating stored hot water, and an exhaust gas heat exchanger 23 which is connected to the point upstream the cooling water heat exchanger 13 as an example of the second heat exchanging means of the present invention to recover heat and water from the exhaust gas from the combustor 22. The fuel cell cogeneration system also comprises a stored hot water measuring means 36 of measuring the temperature of stored hot water flown into the cooling water heat exchanger 13, a flow rate controlling means 37 of giving an instruction of controlling the flow rate of stored hot water in the stored hot water pathway 15 and a flow rate adjusting means 38 which is an example of stored hot water flow rate adjusting means of the present invention of adjusting the flow rate of stored hot water by an instruction from the flow rate controlling means 37, provided in the stored hot water pathway 15 between the exhaust gas heat exchanger 23 and the cooling water heat exchanger 13.

The arrows A and B in FIG. 1 indicate the flow of stored hot water during the electricity-generating operation of the fuel cell cogeneration system and the flow of stored hot water during starting, respectively.

Next, the operation of the fuel cell cogeneration system thus arranged will be described.

The operation during electricity-generating operation will be described hereinafter.

The fuel processing means 21 heats a starting material such as natural gas supplied externally in an atmosphere containing water vapor to produce a fuel gas containing hydrogen. The fuel processing means 21 is heated by the combustor 22. The exhaust gas heat exchanger 23 transfers heat from the exhaust gas discharged from the combustor 22 to stored hot water while recovering condensed water vapor from the exhaust gas.

The fuel cell 11 performs electricity generation from the fuel gas thus produced and an oxidizer gas supplied from the air supplying unit 41. Cooling water is circulated via the fuel cell 11 by the cooling water circulating pump 12 to remove the heat generated by electricity generation. The cooling water the temperature of which has been raised is subjected to heat exchange with stored hot water in the cooling water heat exchanger 13 to release heat. During the generation of electricity (during electricity-generating operation), the three-way valves 34, 35 in the stored hot water pathway switching means 33 are switched to the side indicated by the arrow A, so that the stored hot water is taken out from the bottom of the stored hot water tank 31 and then circulated by the stored hot water circulating pump 32 sequentially through various heat exchangers, i.e., exhaust gas heat exchanger 23 and cooling water heat exchanger 13 to recover heat. The stored hot water which has thus recovered heat is then returned to the top of the stored hot water tank 31. Thus, stored hot water the temperature of which has been raised is sequentially supplied into the stored hot water tank 31 at the top thereof to perform lamination boiling.

Next, the operation of staring the fuel cell cogeneration system having the aforesaid arrangement will be described.

In order to start this fuel cell cogeneration system, it is necessary that the temperature of the fuel cell 11 and the fuel processing means 21 reach a predetermined reactivity temperature. To this end, it is necessary that they be each preheated. The fuel processing means 21 is heated by the combustor 22 to raise its temperature. During starting, the three-way valves 34, 35 in the stored hot water pathway switching means 33 are switched to the side indicated by the arrow B. In this manner, the stored hot water pathway 15 is switched such that the heat of hot water stored in the stored hot water tank 31 is transferred to the fuel cell 11. In other words, the heated water stored in the top of the stored hot water tank 31 is taken out and then circulated through the stored hot water pathway 15 by the stored hot water circulating pump 32. The stored hot water flowing through the stored hot water pathway 15 recovers heat from the exhaust gas in the exhaust gas heat exchanger 23 to raise its temperature. The stored hot water the temperature of which has been thus raised undergoes heat exchange in the cooling water heat exchanger 13 with the cooling water which is being circulated through the cooling water pathway 16 to heat the cooling water. Thereafter, the stored hot water which has given heat to the cooling water is returned to the bottom of the stored hot water tank 31. On the other hand, the cooling water thus heated flows through the fuel cell 11 to cause the fuel cell 11 to raise its temperature to a predetermined desired temperature required for electricity generation (operating temperature of fuel cell as an example of the first predetermined temperature of the present invention).

The flow rate controlling means 37 adjusts the flow rate adjusting means 38 to reduce the flow rate of stored hot water flowing through the stored hot water pathway 15 when the temperature of stored hot water at the inlet of the cooling water heat exchanger 13 measured by the stored hot water temperature measuring means 36 is the desired temperature or less. As a result of the reduction of the flow rate of stored hot water flowing through the stored hot water pathway 15, the temperature of the stored hot water rises, making the difference between the temperature of stored hot water on the stored hot water pathway 15 side of the cooling water heat exchanger 13 and the temperature of cooling water on the cooling water pathway 16 side of the cooling water heat exchanger 13 greater and hence making it possible to efficiently transfer the heat stored in the stored hot water tank 31 and/or the heat generated in the fuel processing means 21 to the fuel cell 11. Accordingly, as a result, the time required until the temperature required to start the fuel cell 11 is reached can be reduced.

Further, the drop of the flow rate of stored hot water is predetermined such that the difference between the temperature of stored hot water and the desired temperature can be kept at at least a predetermined value when the temperature of stored hot water is raised.

And, when the temperature of the fuel cell 11 reaches the desired temperature to complete the preparation for electricity generation, the three-way valves 34, 35 are switched to start normal operation.

Examples of such a desired temperature include 60° C. to 80° C. in the case where the fuel cell 11 is of polymer electrolyte type. Preferred examples of the difference between the temperature of stored hot water and the desired temperature include 5° C. to 10° C.

In accordance with such a fuel cell cogeneration system, the heat stored in the stored hot water tank 31 during the operation of electricity generation can be utilized to raise the temperature of the fuel cell 11 during starting. As a result, the electric power consumed during starting can be reduced, making it possible to enhance the efficiency of the fuel cell cogeneration system. Further, by recovering heat from the exhaust gas so that the stored hot water can further raise its temperature and undergoes heat exchange with cooling water in the cooling water heat exchanger 13, the temperature difference between stored hot water and cooling water can be made greater, making it possible to reduce the time required to raise the temperature of the fuel cell 11.

In addition, even when the temperature of hot water stored in the stored hot water 31 is less than the desired temperature for raising the temperature of the fuel cell 11, the heat of the exhaust gas from the combustor 22 can be recovered in the exhaust gas heat exchanger 23 to raise the temperature of the fuel cell 11 to the desired temperature.

Further, the flow rate of stored hot water can be adjusted so as to keep the temperature of stored hot water in the cooling water heat exchanger 13 constant or more, making it possible to reduce the time required to raise the temperature of the fuel cell 11. Moreover, when the difference in temperature between stored hot water and cooling water in the cooling water heat exchanger 13 is kept constant or more, the time required to raise the temperature of the fuel cell 11 can be further reduced.

In accordance with the cogeneration system of the present embodiment, when the fuel cell system is used at home for example, the use of heat from the stored hot water tank 31 is little limited even during the starting of the fuel cell, making it possible to sufficiently use heat at home.

Embodiment 2 of Implementation

Figure 2:
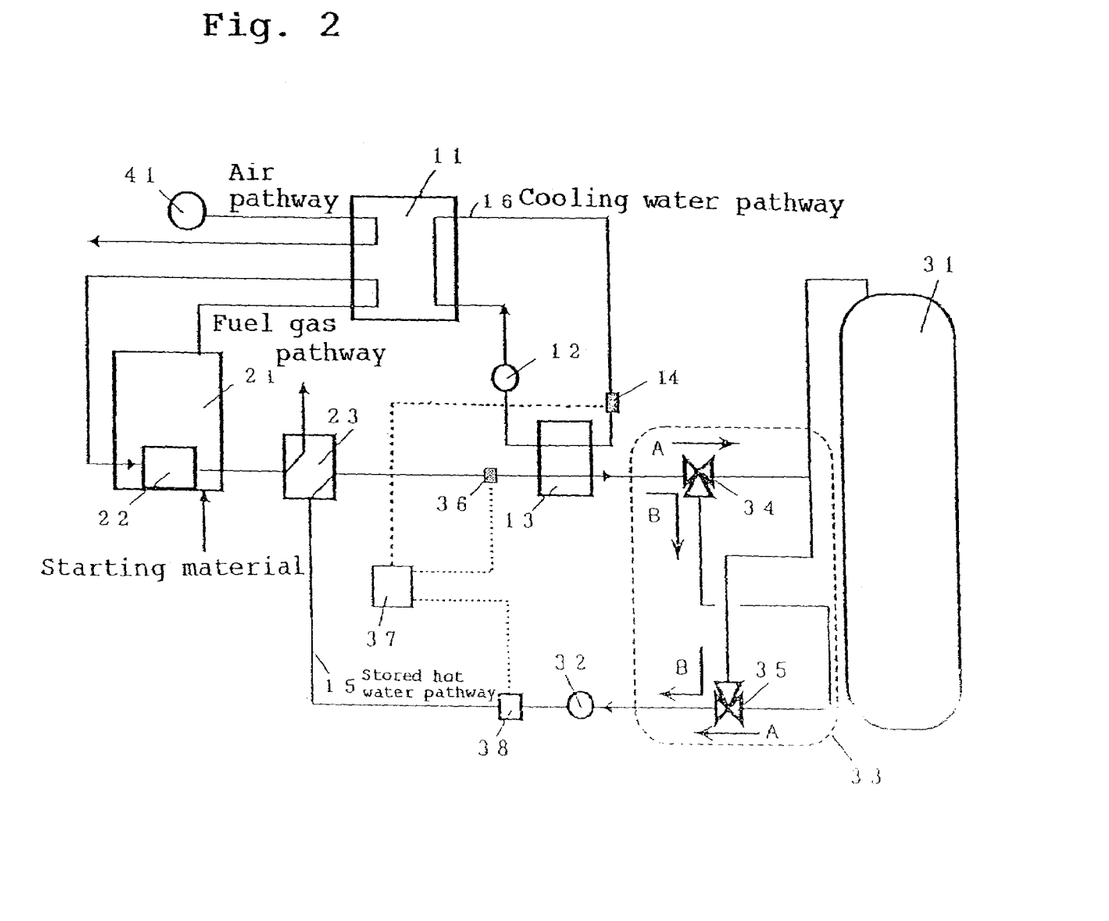
FIG. 2 is a configurational diagram of a fuel cell cogeneration system of embodiment 2 of implementation of the present invention.

FIG. 2 is a configurational diagram illustrating a fuel cell cogeneration system in the embodiment 2 of implementation of the present invention. The same constituent elements as in Embodiment 1 of implementation are given the same reference numerals and their description will be omitted. The fuel cell cogeneration system of the present embodiment of implementation of the invention further comprises as a constituent element a cooling water temperature measuring means 14 provided upstream the cooling water heat exchanger 13 of measuring the temperature of cooling water at the inlet of the cooling heat exchanger 13. And, the flow rate controlling means 37 further has a function of adjusting the flow rate of stored hot water flowing through the stored hot water pathway 15 on the basis of the temperature of stored hot water and the temperature of cooling water by the flow rate adjusting means 38.

The operation of the fuel cell cogeneration system of the present embodiment thus arranged during starting will be described hereinafter. The description of the same operation as in Embodiment 1 of implementation will be omitted.

The hot water thus heated and stored in the stored hot water 31 undergoes heat exchange with the cooling water in the cooling water heat exchanger 13 to heat the cooling water. At this time, the flow rate controlling means 37 controls the flow rate adjusting means 38 to adjust the flow rate of stored hot water such that the difference between the temperature of cooling water measured by the cooling water temperature measuring means 14 and the temperature of stored hot water measured by the stored hot water measuring means 36 is a predetermined value or more and the temperature of stored hot water reaches minimum while satisfying the requirement. In other words, when the difference between the temperature of cooling water and the temperature of stored hot water is less than the predetermined temperature difference (that is, when the temperature of stored hot water is less than the sum of the temperature of cooling water and a predetermined temperature), the flow rate controlling means 37 gives an instruction to the flow rate adjusting means 38 to reduce the flow rate of stored hot water flowing through the stored hot water pathway 15.

However, at this time, the flow rate controlling means 37 causes the flow rate adjusting means 38 to predetermine the flow rate of stored hot water such that the temperature of stored hot water reaches a second predetermined temperature or less. The term "second predetermined temperature" as used herein means the upper limit of temperature required to recover a predetermined amount of water content contained in the exhaust gas discharged from the fuel processing means 21 in the exhaust gas heat exchanger 23. Examples of such an upper limit include 40° C. to 50° C.

The stored hot water which has been subjected to heat exchange in the exhaust gas heat exchanger 23 and the cooling water heat exchanger 13 is then returned to the bottom of the stored hot water tank 31.

In accordance with the constitution of the fuel cell cogeneration system of the present embodiment, the flow rate of stored hot water can be adjusted to keep the difference between the temperature of stored hot water in the cooling water heat exchanger 13 and the temperature of cooling water in the cooling water heat exchanger 13 constant or more and keep the temperature of the stored hot water outlet of the exhaust gas heat exchanger 23 (i.e., temperature of the stored hot water inlet of the cooling water heat exchanger 13) at the second predetermined temperature or less. As a result, the time required to raise the fuel cell 11 can be reduced and the amount of water recovered in the exhaust gas heat exchanger 23 can be maintained at a predetermined value or more.

While Embodiments 1 and 2 of implementation have been described with reference to the case where the flow rate of stored hot water is adjusted by the flow rate adjusting means 38, the stored hot water flow rate adjusting means of the present invention may be integrated with the stored hot water circulating pump 32 such that the flow rate of stored hot water is adjusted by the amount operated by the stored hot water pump 32. In this case, the arrangement may be made such that when the flow rate controlling means 37 gives an instruction of reducing the flow rate of stored hot water, the amount operated by the stored hot water pump 32 is adjusted according to the instruction, and, in this case, too, the same effect as mentioned above can be exerted.

Embodiment 3 of Implementation

Figure 3:
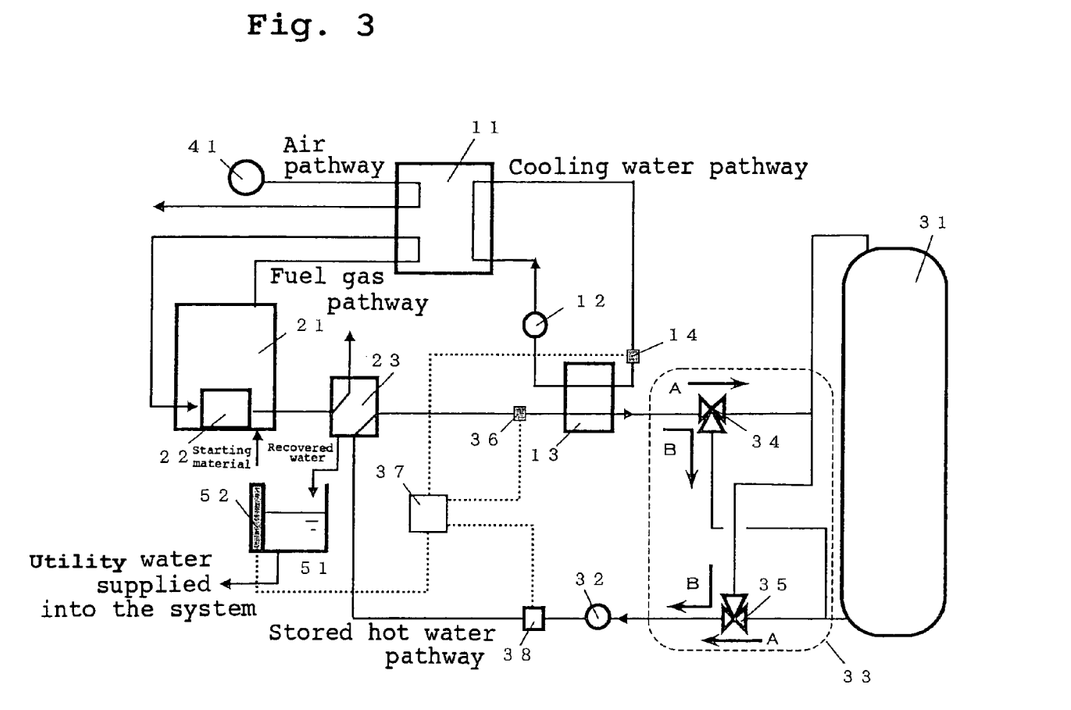
FIG. 3 is a configurational diagram of a fuel cell cogeneration system of embodiment 3 of implementation of the present invention.

The fuel cell cogeneration system of the present embodiment of implementation of the invention shown in FIG. 3 comprises a recovered water tank 51 connected to the exhaust gas heat exchanger 23. Inside the recovered water tank 51 is provided a water amount measuring means 52 of detecting the amount of water (water level) recovered from the exhaust gas heat exchanger 23. The water amount measuring means 52 is connected to the flow rate controlling means 37.

Next, the operation of the fuel cell cogeneration system of the present embodiment will be described.

The hot water thus heated and stored in the stored hot water tank 31 undergoes heat exchange with the cooling water in the cooling water heat exchanger 13 to heat the cooling water. At this time, the flow rate controlling means 37 controls the flow rate adjusting means 38 to adjust the flow rate of stored hot water such that the difference between the temperature of cooling water measured by the cooling water temperature measuring means 14 and the temperature of stored hot water measured by the stored hot water measuring means 36 is a predetermined value or more and a water level in the recovered water tank 51 is kept while satisfying the requirement. In other words, when the difference between the temperature of cooling water and the temperature of stored hot water is the predetermined temperature difference or less, the flow rate controlling means 37 gives an instruction to the flow rate adjusting means 38 to reduce the flow rate of stored hot water flowing through the stored hot water pathway 15.

The water which has been recovered by the recovered water tank 51 is then supplied into various portions of the fuel cell cogeneration system. Accordingly, when the amount of water recovered from the exhaust gas heat exchanger 23 (amount of water entering into the recovered water tank 51 in a predetermined period of time) and the flow rate of water supplied into the various portions from the recovered water tank 51 (amount of water discharged from the recovered water tank 51 in the aforesaid predetermined period of time) are balanced, the water level in the recovered water tank 51 is kept constant. When the flow rate of water recovered from the exhaust gas heat exchanger 23 is small as compared with the flow rate of water supplied from the recovered water tank 51, the water level in the recovered water tank 51 lowers.

When the water amount measuring means 52 detects that the water level in the recovered water tank 51 reaches a predetermined level or less, the flow rate controlling means 37 adjusts the flow rate adjusting means 38 to adjust the drop of the flow rate of stored hot water flowing through the stored hot water pathway 15 such that the amount of water recovered by the recovered water tank 51 increases until the water level in the recovered water tank 51 reaches the predetermined water level. When the water level in the tank 51 doesn't reach the predetermined value, the flow rate controlling means 37 adjusts the flow rate adjusting means 38 to increase the flow rate of stored hot water flowing through the stored hot water pathway 15 under the condition that the difference between the temperature of cooling water and the temperature of stored hot water is the predetermined value or more. When the flow rate of stored hot water increases, the temperature of stored hot water falls, causing the amount of condensed water vapor recovered in the exhaust gas heat exchanger 23 to rise. In other words, the flow rate of stored hot water is reduced such that the difference between the temperature of cooling water and temperature of stored hot water reaches the predetermined value or more under the condition that the water level in the recovered water tank 51 is maintained at the predetermined value. As a result, the flow rate of water entering the recovered water tank 51 is greater than the flow rate of water discharged from the recovered water tank 51, causing the water level in the recovered water tank 51 to rise.

Thus, in accordance with the fuel cell cogeneration system of the present embodiment, the amount of water recovered in the exhaust gas heat exchanger 23 can be kept at a value required to operate the system while reducing the time required to raise the temperature of the fuel cell during starting.

Embodiment 2 of implementation has been described with reference to the case where the amount of water recovered in the exhaust gas heat exchanger 23 is maintained such that the temperature of stored hot water reaches the second predetermined temperature or less, but the second predetermined temperature corresponds to the temperature of stored hot water developed when the predetermined water level in the recovered water tank 51 is maintained as described in the present embodiment.

As mentioned above, in accordance with the constitution of the fuel cell cogeneration system of the present invention, the heat of hot water stored in the stored hot water tank during the starting of electricity generation operation can be utilized to reduce the time required to raise the temperature of the fuel cell.

While the description has been made with reference to the case where the stored hot water tank of the present invention is of lamination boiling type, other types of stored hot water tank may be used, and, in this case, too, the same effect as mentioned above can be exerted.

Further, while the description has been made with reference to the case where all the heat generated by the fuel cell 11 is stored in the stored hot water tank 31 during the operation of the fuel cell cogeneration system of the present invention, part of the heat generated by the fuel cell 11 may be stored in the stored hot water tank 31, and, the same effect as mentioned above can be exerted if stored hot water the temperature of which is higher than ordinary temperature is supplied from the stored hot water tank 31 during the starting of the fuel cell cogeneration system of the present invention. Further, even when the temperature of hot water stored in the stored hot water tank 31 is not higher than ordinary temperature, heat exchange can be effected in the exhaust gas heat exchanger 23, and, in this case, too, the same effect as mentioned above can be exerted.

Moreover, while the description has been made with reference to the case where the stored hot water controlling means of the present invention is formed by the three-way valves 34, 35, the stored hot water controlling means may be arranged such that the pathway from the stored hot water tank 31 to the stored hot water pathway 15 is switched by other means, and, in this case, too, the same effect as mentioned above can be exerted.

Further, while the description has been made with reference to the case where the second heat exchanging means of the present invention comprises the exhaust gas heat exchanger 23 formed separately of fuel processing means, the second heat exchanging means of the present invention may be formed integrally with the fuel processing means of the present invention, and, the same effect as mentioned above can be exerted so far as it is arranged such that the exhaust gas discharged from the fuel processing means of the present invention undergoes heat exchange with stored hot water.

Moreover, while the description has been made with reference to the case where the first predetermined temperature of the present invention is the operating temperature of the fuel cell, the first predetermined temperature of the present invention may be higher than the operating temperature of the fuel cell. Further, in the case where the temperature of stored hot water is controlled to the second predetermined temperature or less, the first predetermined temperature of the present invention may be temporarily lower than the operating temperature.

The present invention also concerns a program of executing the function of all or part of units or devices of the flow rate controlling means of the aforementioned fuel cell cogeneration system of the present invention by computer, including a program operating in cooperation with computer.

The present invention further concerns a medium having a program of executing the function of all or part of units or devices of the flow rate controlling means of the aforementioned fuel cell cogeneration system of the present invention by computer supported thereon, including a computer-readable medium from which the aforementioned program can be read to execute the aforementioned function in cooperation with the aforementioned computer.

Further, the term "part of units or devices" as used herein means some of the plurality of units or devices or part of functions or operations of one unit or device.

Moreover, the term "part of units or devices" as used herein means some of the plurality of units or devices or some of units or devices of one unit or device or some functions of one unit.

Further, a computer-readable recording medium having a program of the present invention recorded thereon is included in the present invention.

Moreover, one of the working forms of the program of the present invention may be such that the program is recorded in a computer-readable recording medium to operate in cooperation with computer.

Further, another working form of the program of the present invention is such that the program is transmitted by the transmission medium and then read by computer to operate in cooperation with computer.

Examples of the recording medium include ROM, etc. and examples of the transmission medium include transmission media such as internet, light, electrical radiation, sound wave, etc.

Further, the aforesaid computer of the present invention is not limited to sheer hardwares such as CPU but may include farmware, OS, and periphery.

As mentioned above, the constitution of the present invention may be realized on a software basis or hardware basis.

In accordance with the fuel cell cogeneration system, method of operating the fuel cell cogeneration system and program and recording medium therefor according to the present invention, the temperature of cooling water can be raised in a short period of time even when the difference between the temperature of stored hot water and the temperature of cooling water is small, making it possible to reduce the time required for starting, and they are useful for the fuel cell cogeneration system having a stored hot water tank, etc.

The invention claimed is:

1. A fuel cell cogeneration system comprising:
    a fuel cell connected to a fuel processing means and having a cooling water pathway, through which cooling water flows;
    a first heat exchanging means provided on the cooling water pathway;
    a stored hot water pathway through which stored hot water undergoes heat exchange with the cooling water via the first heat exchanging means;
    a hot water tank for storing the hot water;
    a stored hot water controlling means of circulating the stored hot water so as to transfer the heat of hot water stored in the stored hot water tank to the fuel cell via the stored water pathway and the first heat exchanging means during the starting of operation of the fuel cell;
    a stored hot water temperature measuring means of measuring the temperature of stored hot water flowing into the first heat exchanging means;
    a stored hot water flow rate adjusting means of adjusting the flow rate of stored hot water flowing through the stored hot water pathway;
    a flow rate controlling means of controlling the stored hot water flow rate adjusting means on the basis of the temperature of stored hot water measured by the stored hot water measuring means; and
    a second heat exchanging means connected to the stored hot water pathway upstream of the first heat exchanging means of exchanging heat with exhaust gas of the fuel processing means,
    wherein the flow rate controlling means controls the stored hot water flow rate adjusting means to reduce the flow rate of stored hot water flowing through the stored hot water pathway when the temperature of the stored hot water is a first predetermined temperature or less during the starting of operation of the fuel cell.

2. The fuel cell cogeneration system according to claim 1, wherein the first predetermined temperature is an operating temperature of the fuel cell.

3. The fuel cell cogeneration system according to claim 1, wherein a cooling water temperature measuring means is further provided upstream of the first heat exchanging means on the cooling water pathway and the flow rate controlling means adjusts the stored hot water flow rate adjusting means so that the temperature of stored hot water rises to further reduce the flow rate of stored hot water flowing through the stored hot water pathway when the temperature of stored hot water is less than the sum of the cooling water temperature and a predetermined temperature.

4. The fuel cell cogeneration according to claim 3, wherein the flow rate controlling means adjusts the stored hot water flow rate adjusting means so that the temperature of stored hot water rises to a second predetermined temperature as upper limit to reduce the flow rate of stored hot water flowing through the stored hot water pathway and
    the second predetermined temperature is determined by the temperature required to recover a predetermined amount of water content contained in exhaust gas discharged by the fuel processing means in the second heat exchanging means.

5. The fuel cell cogeneration system according to claim 4, wherein a recovered water tank of recovering water content contained in exhaust gas discharged by the fuel processing means and the second predetermined temperature is the temperature at which a predetermined water level can be maintained in the recovered water tank while supplying the recovered water into the system.

6. The fuel cell cogeneration system according to claim 1 or 3, wherein a recovered water tank of recovering water content contained in exhaust gas discharged by the fuel processing means is further provided and the flow rate controlling means adjusts the stored hot water flow rate adjusting means to suspend the drop of the flow rate of stored hot water flowing through the stored hot water pathway or to increase the flow rate of the stored hot water when the water level in the recovered water tank falls below the predetermined value while supplying the recovered water into the system.

7. The fuel cell cogeneration system according to claim 1, wherein the first predetermined temperature is predetermined within a range of from 60° C. to 80° C.

8. The fuel cell cogeneration system according to claim 4, wherein the second predetermined temperature is predetermined within a range of from 40° C. to 50° C.

9. The fuel cell cogeneration system according to claim 3, wherein the predetermined temperature is predetermined within a range of from 5° C. to 10° C.

10. A method of operating a fuel cell cogeneration system comprising:

a step of circulating stored hot water so as to transfer the heat of hot water stored in a stored hot water tank to a cooling water pathway of a fuel cell via a stored water pathway and a first heat exchanging means during the starting of operation of the fuel cell;

a step of measuring the temperature of stored hot water flowing into the first heat exchanging means;

a step of transferring the heat of exhaust gas from a fuel processing means to the stored hot water via a second heat exchanging means connected to the stored hot water pathway upstream of the first heat exchanging means; and a step of reducing the flow rate of stored hot water flowing through the stored hot water pathway when the temperature of the stored hot water is a first predetermined temperature or less during the starting of operation of the fuel cell.

* * * * *